(12) United States Patent
Taghizadeh et al.

(10) Patent No.: US 8,073,299 B2
(45) Date of Patent: Dec. 6, 2011

(54) FABRICATION OF NANOSTRUCTURED MATERIALS

(75) Inventors: Mohammad Reza Taghizadeh, Edinburgh (GB); Ryszard Buczynski, Warsaw (PL)

(73) Assignee: Herlot-Watt University, Edinburgh (GB)

(*) Notice: Subject to any disclaimer, the term of this patent is extended or adjusted under 35 U.S.C. 154(b) by 181 days.

(21) Appl. No.: 12/374,409

(22) PCT Filed: May 31, 2007

(86) PCT No.: PCT/GB2007/002018
§ 371 (c)(1),
(2), (4) Date: Jul. 31, 2009

(87) PCT Pub. No.: WO2008/009873
PCT Pub. Date: Jan. 24, 2008

(65) Prior Publication Data
US 2009/0304340 A1    Dec. 10, 2009

(30) Foreign Application Priority Data

Jul. 18, 2006 (GB) .................................. 0614272.3

(51) Int. Cl.
*G02B 6/04* (2006.01)
*C03B 37/028* (2006.01)

(52) U.S. Cl. ........ 385/115; 385/123; 385/124; 385/126; 385/127; 65/411; 65/385

(58) Field of Classification Search .................... 385/14, 385/123, 124, 125, 126, 127, 128, 141, 37, 385/115, 116; 65/385, 405, 442, 411
See application file for complete search history.

(56) References Cited

U.S. PATENT DOCUMENTS

| | | | |
|---|---|---|---|
| 6,301,420 B1* | 10/2001 | Greenaway et al. | 385/126 |
| 6,598,428 B1* | 7/2003 | Cryan et al. | 65/409 |
| 7,116,875 B2* | 10/2006 | Wadsworth et al. | 385/123 |
| 7,734,137 B2* | 6/2010 | Bennett et al. | 385/126 |
| 2002/0021064 A1 | 2/2002 | Devoe et al. | 313/105 CM |
| 2004/0151450 A1* | 8/2004 | Wadsworth et al. | 385/123 |
| 2005/0025965 A1* | 2/2005 | Sanghera et al. | 428/364 |
| 2005/0041944 A1 | 2/2005 | Cryan et al. | 385/123 |
| 2006/0286488 A1* | 12/2006 | Rogers et al. | 430/325 |
| 2009/0304340 A1* | 12/2009 | Taghizadeh et al. | 385/115 |

FOREIGN PATENT DOCUMENTS

| | | |
|---|---|---|
| GB | 1 229 528 | 4/1974 |
| JP | 2003128429 A | 5/2003 |

OTHER PUBLICATIONS

Mohammed R Taghizadeh et al., Developing Diffractive Optics for Optical Computing, IEEE Micro, vol. 14, pp. 10-19, Dec. 1994.

* cited by examiner

*Primary Examiner* — Brian Healy
(74) *Attorney, Agent, or Firm* — Young Basile Hanlon & MacFarlane PC

(57) ABSTRACT

A method for fabricating composite materials/devices comprising stacking together fibers or rods of at least two different materials and drawing the fibers or rods. Using this process, devices having nanoscale features can be readily fabricated.

11 Claims, 5 Drawing Sheets

FABRICATION OF NANOSTRUCTURED MATERIALS

FIELD OF THE INVENTION

The present invention relates to a method for the fabrication of nanostructured materials, and nanostructured devices formed therefrom. The present invention has particular applicability to the field of optics.

BACKGROUND TO THE INVENTION

The design and fabrication of micrometer scale surface relief elements is a mature and highly flexible technology. Current fabrication techniques involve laser writing and electron beam writing of masks, followed by photolithography and etching, or direct laser and e-beam writing. For example, Mohammad R. Taghizadeh et al, IEEE Micro Volume 14, Number 6, pp. 10-19, December 1994, describes a technique for making diffractive optical elements. However, these known techniques have limited resolutions. This means that many small-scale devices cannot be fabricated easily. In addition, most known technology is not suitable for relatively high throughput applications.

SUMMARY OF THE INVENTION

According to one aspect of the present invention, there is provided a method for fabricating composite materials/devices comprising stacking together fibers or rods of at least two different materials, and drawing the fibers.

By repeatedly drawing the fibers or rods small-scale composite devices can be manufactured. Indeed, devices having nanoscale features can be made, for example features having dimensions smaller than 100 nm.

The technique of the present invention is particularly suited to the manufacture of small-scale optical elements. In this case, the materials may be dielectric and may have different refractive indices.

By the proper distribution of different optical materials, a gradient index material with an arbitrary refractive index can be obtained. This is particularly useful in the design and formation of novel refractive, micro-optical and diffractive elements, such as a gradient index lens or any diffractive optical element (DOEs).

The method may involve heating the fibers or rods, so that they fuse together, thereby to substantially in-fill any gaps or holes between them.

The present invention can be used to make many different devices, such as 1D and 2D arrays, single microlenses, photonic bandgap materials and nanostructured DOEs.

BRIEF DESCRIPTION OF THE DRAWINGS

Various aspects of the present invention will now be described by way of example only and with reference to the accompanying drawings, of which:

FIG. 3(*b*) is a simulation of the cross-section of the focal spot at the focal plane for the lens of FIG. 3(*a*);

FIG. 4(*b*) is a simulation of the cross-section of the focal spot at the focal plane for the lens of FIG. 4(*a*);

FIG. 5(*b*) is a representation of a nanostructured lens that has properties designed to be the same as the lens of FIG. 5(*a*);

DETAILED DESCRIPTION OF THE DRAWINGS

Figure 1:
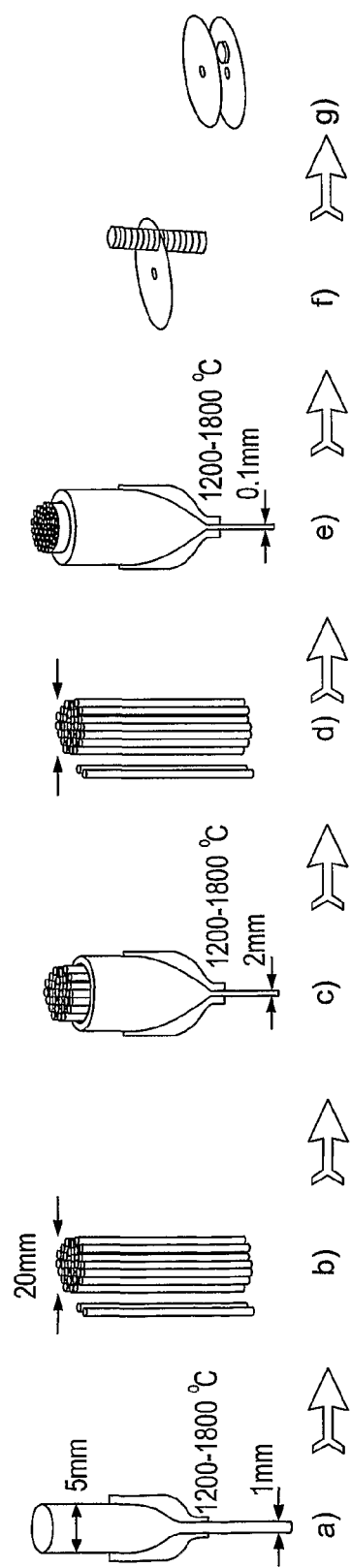
FIG. 1 is a flow diagram showing the steps taken to fabricate a nanoscale optical device.

The present invention is based on the well-established "stack and draw" method of fabrication, currently used in the creation of imaging plates and double-glass photonic crystals. This is illustrated in FIG. 1. The stack and draw method has previously only been used for drawing materials of the same composition. In contrast, in the present invention a plurality of different materials is used, so that composites can be formed, and devices made from such composites.

Fabrication commences with the assembly of a macroscopic preform with the same structure and pattern as that desired in the final material. To make such a macroscopic preform, it is preferable to stack a large number of rods or fibers, for example glass rods or fibers, together in a desired structure and pattern, as illustrated in FIG. 1*b*. These rods may be manufactured using standard drawing technologies or any other suitable technique. The rods or fibers should preferably be of similar diameter, preferably around 1 mm, and be thermally matched so that their coefficient of thermal expansion, softening point and transition temperature should be close. When these conditions are fulfilled the end material will have minimal internal tension and, in the case where glass rods are utilized, similar mechanical properties to a monolithic slab of glass.

The bundled rods are heated to a temperature sufficient to soften and bind them together and allow their drawing into one single rod. Drawing can be done in any suitable drawing structure. Where glass fibers are used, this structure can be a fiber-drawing tower. For glass, the temperature of this tower should be in the region of 1200 to 1600 degrees centigrade. After drawing, this drawn rod is allowed to set and is cut into a number of intermediate preforms. These intermediate preforms are then bundled together to form the final pattern, as illustrated in FIG. 1*d*. This bundle is processed to generate the final nanostructured preform, as illustrated in FIG. 1*e*, by the application of sufficient heat to bind the preforms together followed by 'drawing' of the material by pulling the heated preforms through the drawing structure. This final structured preform may have nanometer feature sizes.

If necessary or desired the stack and draw steps can be repeated, or a number of different final nanostructured preforms can be combined in order to make an array of structures rather than a single structure. In this case, the final nanostructured preform is cut a number of times, or a number of differing final nanostructured preforms are fabricated, and the resultant preforms bundled together, processed through the application of heat and drawing, as previously described, to give a single rod consisting of an array of the nanostructured preforms—a nanostructured preform array. In the case where glass rods and a fiber drawing tower are used, the temperature of this fiber drawing tower should be in the region of 1200 to 1600 degrees centigrade.

Finally, the nanostructured preform or nanostructured preform array, generally in the form of a rod, is cut into pieces with a length according to the desired design functionality, as illustrated in FIG. 1f, to give the final nanostructured material. This step is not necessary in every case. If the nanostructured preform or nanostructured preform array is already of sufficient length, it may not require cutting, and can be considered the final nanostructured material without any further action. The material can then be polished if required, as illustrated in FIG. 1g. Again, this step is not necessary in every case, only where the ends of the final nanostructured material are of insufficient quality to allow the entry and exit of light, if they are to be used as light transmitting devices. For example, if the cut applied to the material is of high enough quality, there may not be any need for polishing at all.

To develop a new optical element using the technique in which the invention is embodied, the device properties desired firstly have to be modeled. This can be done, for example, by calculating a phase profile of the element, preferably a continuous phase profile. Having a continuous phase profile results in best quality output. This is because it is closer to the profile of a conventional device, such as a lens, rather than a binary phase structure. The phase difference can be more than $2\pi$. Once the phase profile is determined, the distribution of nanosized elements in a 2D matrix is calculated. At this stage the optical properties of the volume dielectric materials are determined by designing the final required element and converting the required phase distribution to a refractive index distribution. This refractive index distribution can then be used as the basis for determining the position and distribution of the different materials of the various preforms that are to be used in the drawing process. Once the device is modeled, the preform is fabricated as described previously and used to make an intermediate preform. Then the intermediate preform is drawn and the nanostructured preform is formed. Then the final nanostructured preform is cut, bundled, heated and drawn and subsequently cut into plates with appropriate length for the nanostructured optical elements. If necessary the cut surface is polished to obtain optical quality.

Figure 2:
FIG. 2 is a cross section through an optical device fabricated using the technique of FIG. 1.

FIG. 2 shows an example of a nanostructured lens fabricated in accordance with the present invention. As can be seen this has flat optical surfaces, and is formed from a plurality of materials that have a different refractive index. The materials take the form of columns that extend through and along the optical path of the entire device. As noted above, by appropriately designing and selecting the distribution of the different materials, any optical function can be provided. This has numerous advantages over the prior art. Having flat surfaces means that the device can be readily subjected to further processing, for example polishing or the application of a coating. Equally, in some circumstances, no further processing of the device is needed. This can be a significant advantage over conventional techniques for fabricating, for example, concave or convex lenses, which require careful shaping and polishing techniques to be used.

To compare the properties of a nanostructured microlens fabricated using the present invention to an 'ideal' parabolic standard gradient index microlens, which has a high refractive index in the middle and a low refractive index nearer the edges, a series of Finite Difference Time Domain (FDTD) simulations were carried out. The results of these are shown in FIGS. 3 to 6.

Figure 3:
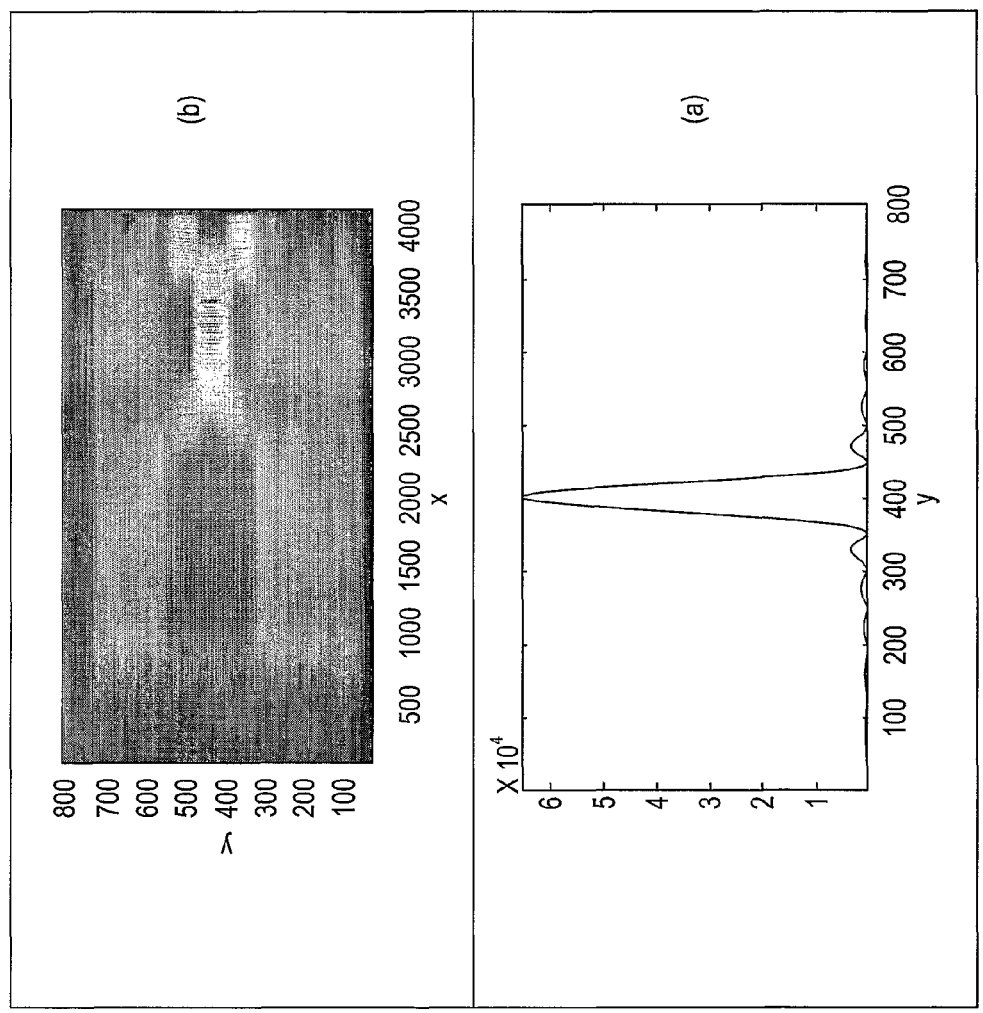
FIG. 3(*a*) is a simulation of the intensity distribution at the focal plane for an ideal 1D parabolic gradient index lens with a diameter of 40 micrometers.
Figure 4:
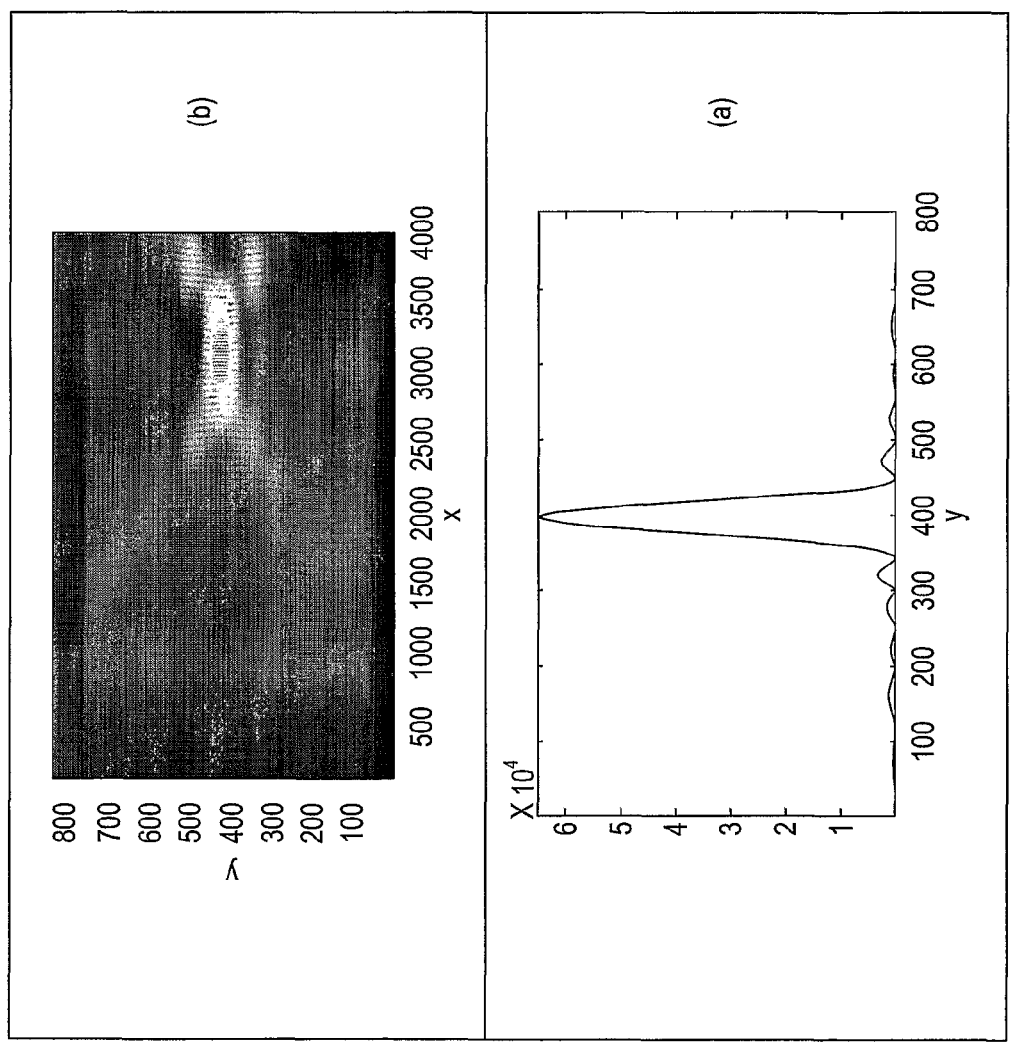
FIG. 4(*a*) is a simulation intensity distribution at the focal plane for a nanostructured microlens with a diameter of 40 micrometers.
Figure 5:
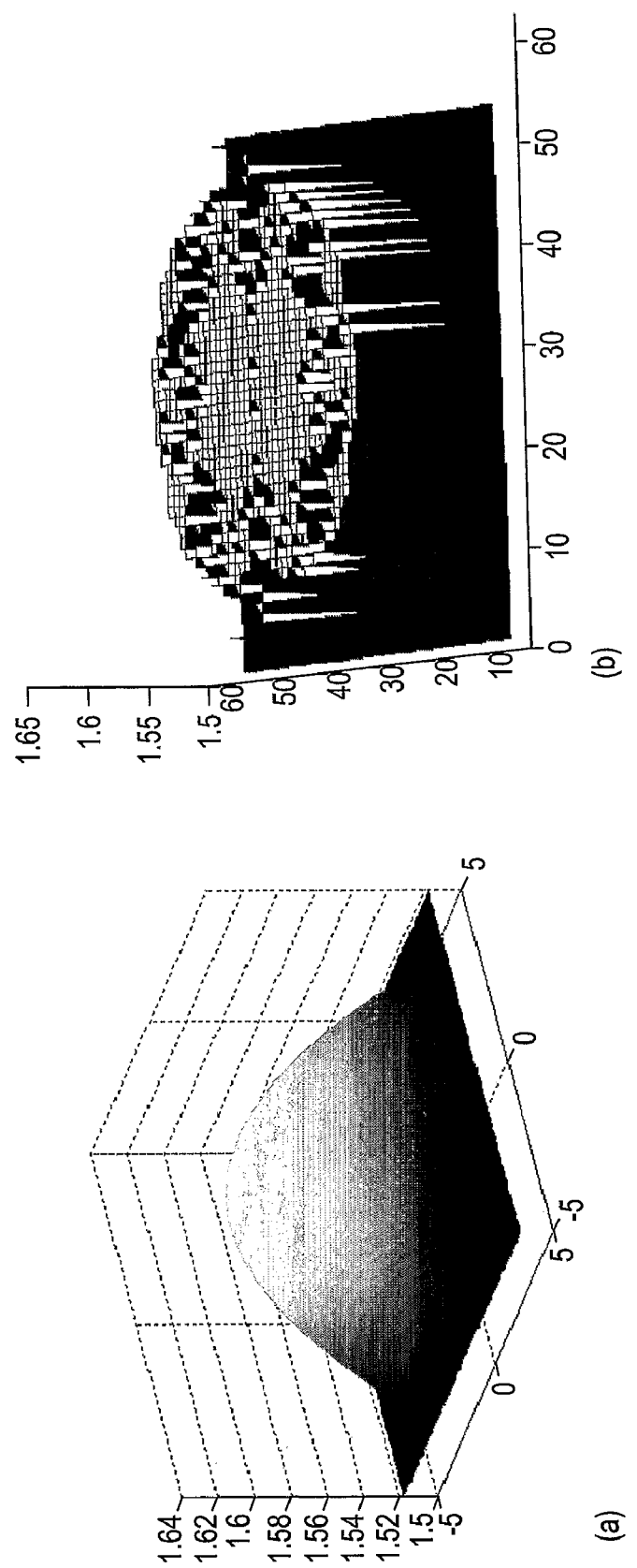
FIG. 5(*a*) is a representation of an ideal 2D parabolic gradient lens with a diameter of 10 micrometers.
Figure 6:
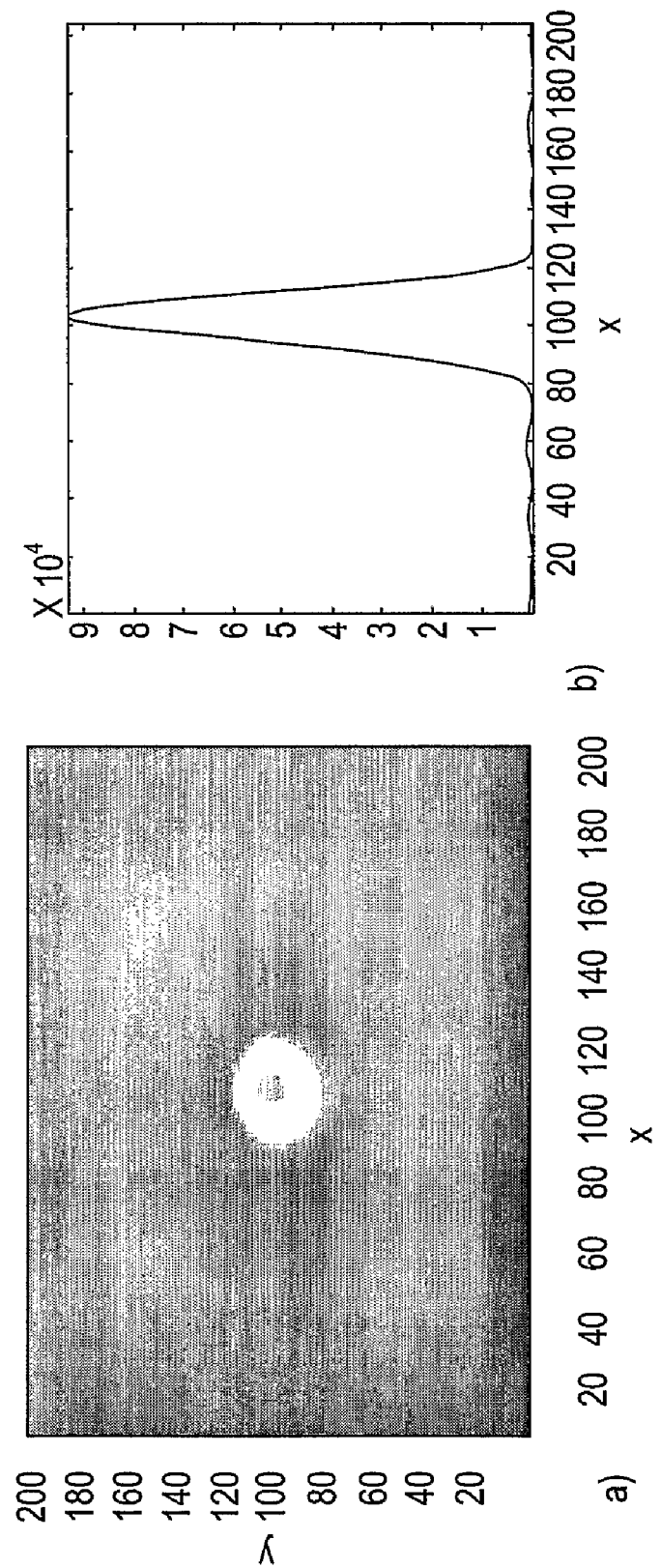
FIG. 6(*a*) shows a simulation of intensity distribution at the focal plane for the nanostructured microlens of FIG. 5(*b*), and FIG. 6(*b*) shows a simulation of the cross-section of focal spot at the focal plane for the lens of FIG. 5(*b*).

In a first set of simulations, 1D lenses with a diameter of 40 µm, effective focal length f≅66 µm and f-number≅1.5 were investigated. A wavelength of $\lambda=1550$ nm with TM polarization and a space discretization of 50 nm/cell ($\lambda/30$) was assumed. The results of a simulation performed for a conventional, ideal parabolic gradient index lens are illustrated in FIG. 3, where FIG. 3(a) is a simulation of the intensity distribution at the focal plane for a gradient index lens with a diameter of 40 micrometers and FIG. 3(b) is a simulation of the cross-section of the focal spot at the focal plane for the lens of FIG. 3(a). The results of the simulation performed for a nanostructured microlens made in accordance with the present invention using nanorods of only two types of glass are illustrated in FIG. 4, where FIG. 4(a) is a simulation intensity distribution at the focal plane for a nanostructured microlens with a diameter of 40 micrometers and FIG. 4(b) is a simulation of the cross-section of the focal spot at the focal plane for the lens of FIG. 4(a). From FIGS. 3 and 4, it can be seen that the characteristics of the device made in accordance with the invention compare very well with those of the conventional lens.

In another simulation, a flat plate nanostructured microlens, as shown in FIG. 5(b), was simulated so as to have properties similar to that of an ideal 2D parabolic gradient index lens with a diameter of 10 µm, as shown in FIG. 5(a). The simulated nanostructured microlens was assumed to be fabricated in accordance with the invention from two type of rods with a refractive index of n=1.619 (F2 glass) and n=1.518 (NC21 glass) respectively. FIGS. 6(a) and (b) show the results of the simulation for the nanostructured microlens. This had a focal length of f≅155.75 µm and the diameter of the beam at focus was equal to 5 µm—the same as in case of the parabolic gradient index lens. Both microlenses have the same value of effective focal length and diameter of the beam at the focus. In addition, as shown in FIG. 6(b), the diameter of the focal spot for the nanostructured microlens is diffraction limited, as in case of ideal gradient index lens. Hence, these simulations show that using the present invention it is possible to obtain nanostructured microlenses with parameters similar to 'ideal' gradient index microlenses.

The present invention provides numerous benefits. For example, it allows the manufacture of optical devices having flat optical surfaces without any curvature. This is useful for microlenses and DOEs. In addition, devices can be easily integrated in 2D arrays with a filling factor close to 100%. Also arbitrary phase profiles can be obtained. This means that any desired device can be produced, for example lenses, in particular spherical lenses, aspherical lenses, elliptical lenses, cylindrical lenses, axicon, and lenses with or without double focus. Using the present invention, all of these can be fabricated with micro or nanoscale features. Also, every element of a 2D array of elements could be arranged to have individual features and phase properties. Also, by suitably arranging the different fibers or rods, a single device can be arranged to have several different functions. For example, one area could be designed as an ashperic micro-lens, whilst another could be an axicon. This facilitates the manufacture of fully integrated optical systems in a single flat plate device.

A skilled person will appreciate that variations of the disclosed arrangements are possible without departing from the invention. For example, whilst the invention has been described primarily with reference to drawing glass fibers, it will be appreciated that other materials could be used. Equally, each rod or fiber need not be made of a single material, but instead could, for example, comprise a core material, such as glass, and be coated with another material. Accordingly the above description of the specific embodiment is made by way of example only and not for the purposes of limitation. It will be clear to the skilled person that minor modifications may be made without significant changes to the operation described.

What is claimed is:

1. A method for fabricating at least one optical element selected from the group comprising a lens, a gradient index lens, a refractive optical element and a diffractive optical element, wherein the optical element has a phase profile, the method comprising:

stacking together fibers or rods of at least two different materials that have different refractive indices; and drawing the fibers or rods;

cutting the drawn materials of the fibers or rods to produce a plurality of composite rods or fibers;

stacking the composite rods or fibers together and drawing the composite stacked rods or fibers; and forming at least one optical element using the stacked and drawn material, wherein the position and distribution of the composite stacked and drawn materials are arranged to define the phase profile of the optical element.

2. A method as claimed in claim 1 comprising repeating the steps of cutting, stacking and drawing.

3. A method as claimed in claim 1 wherein a process of the stacking and the drawing is repeated until nanoscale features are defined.

4. A method as claimed in claim 1, further comprising:
arranging the different materials according to a pre-determined distribution.

5. A method as claimed in claim 1, further comprising:
heating the fibers or rods, so that they fuse together, thereby to substantially in-fill any gaps or holes between them.

6. A method as claimed in claim 5 wherein the heating is done before drawing the stacked fibers or rods.

7. A method as claimed in claim 1, further comprising:
distributing the rods or fibers so that one or more devices having one or more different functions are defined.

8. A method as claimed in claim 1, further comprising:
using materials that have one or more thermal properties that are substantially the same.

9. A device made according to the method of claim 1, the device having a plurality of stacked fibers or rods of the at least two different materials.

10. An integrated optical system that includes a plurality of optical devices made according to the method defined in claim 1, each defined by a variation in refractive index using a plurality of stacked rods or fibers.

11. An integrated optical system as claimed in claim 10 that has parallel plate optical surfaces.

* * * * *